Sept. 19, 1950 P. B. SEARCY 2,522,644
PEANUT HARVESTING MACHINE
Filed Nov. 10, 1947 4 Sheets-Sheet 1
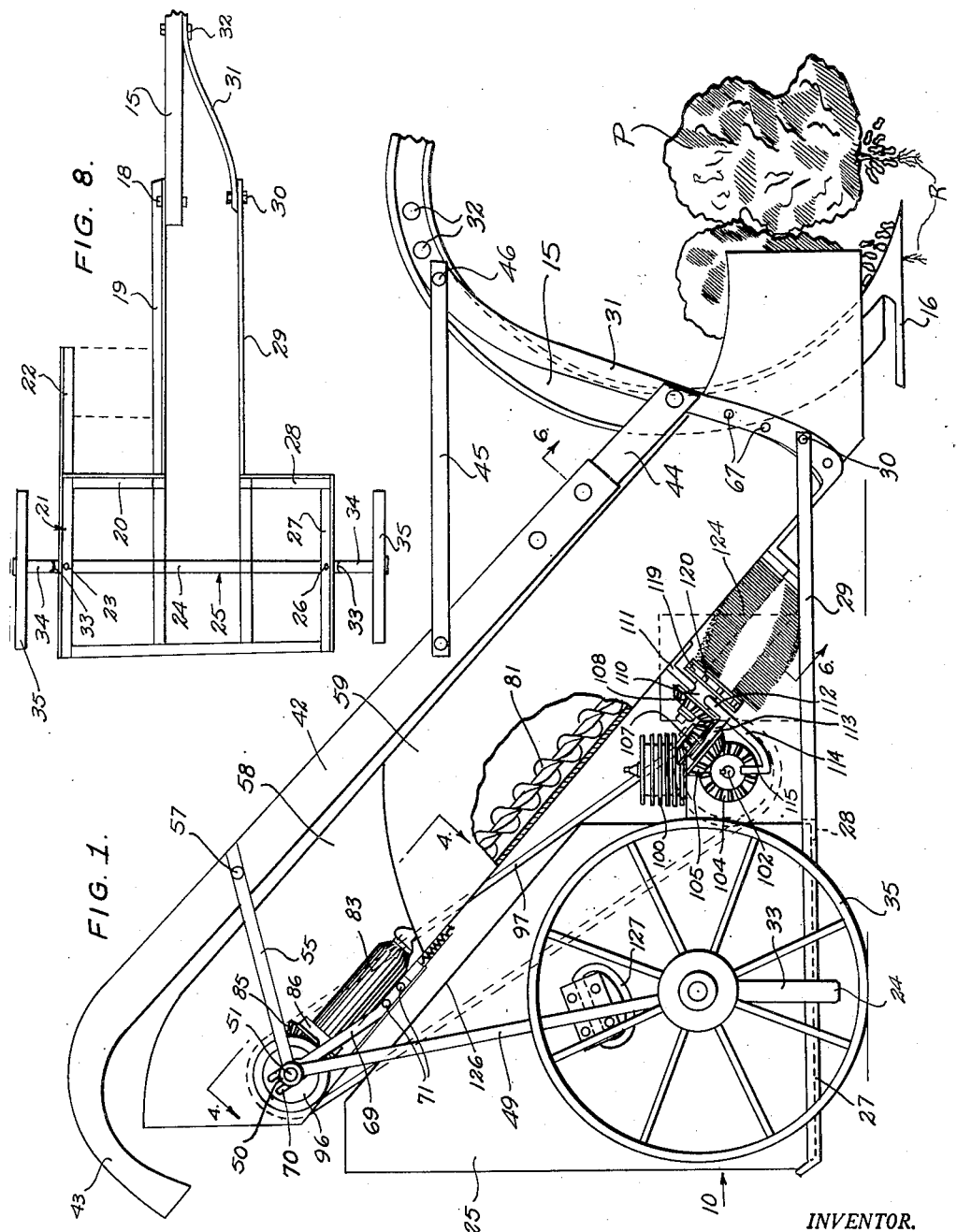
INVENTOR.
PETER B SEARCY,
BY
McMorrow, Berman + Davidson
ATTORNEYS.

Sept. 19, 1950  P. B. SEARCY  2,522,644
PEANUT HARVESTING MACHINE
Filed Nov. 10, 1947  4 Sheets-Sheet 2
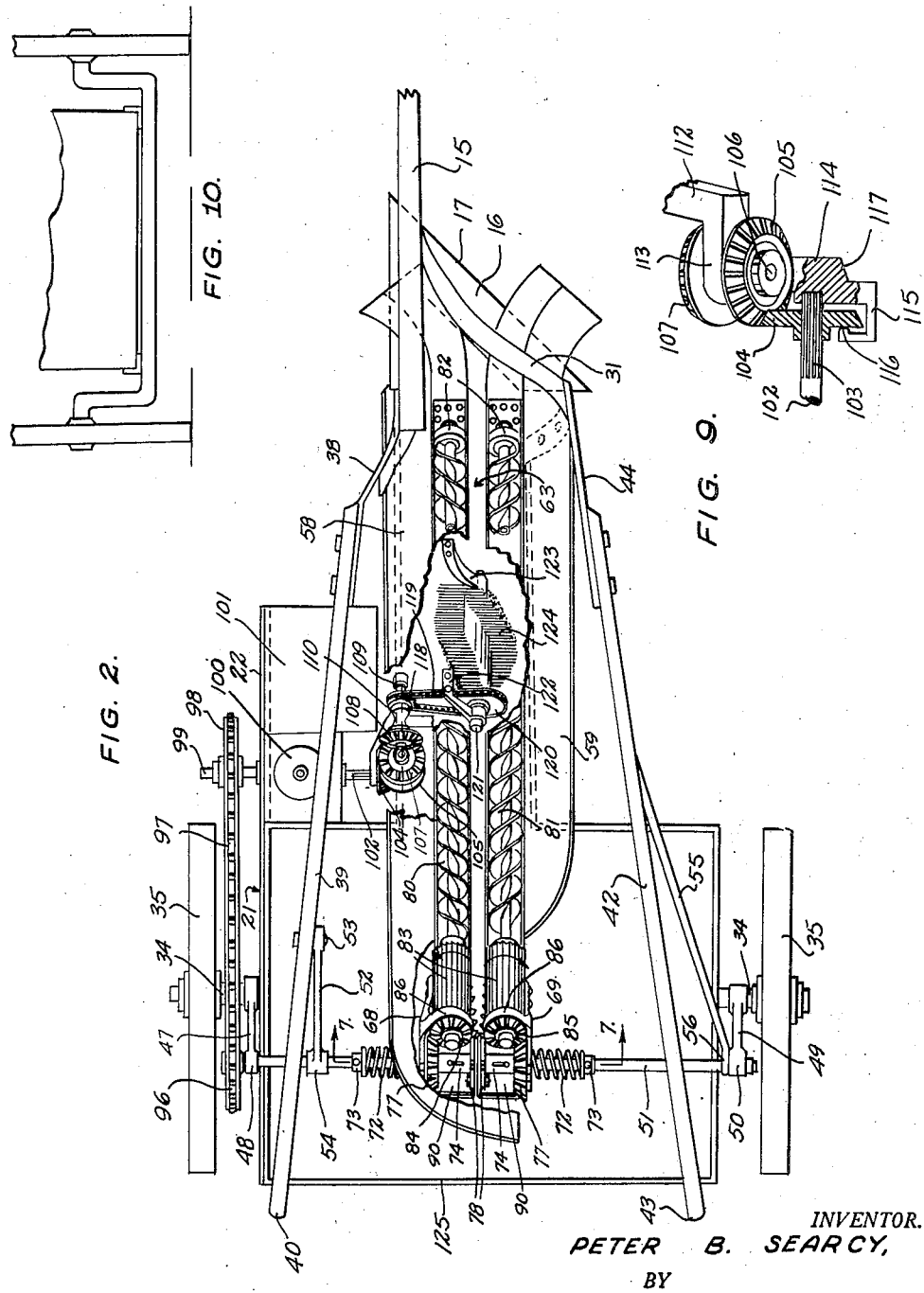
INVENTOR.
PETER B. SEARCY,
BY
McMorrow, Berman & Davidson
ATTORNEYS.

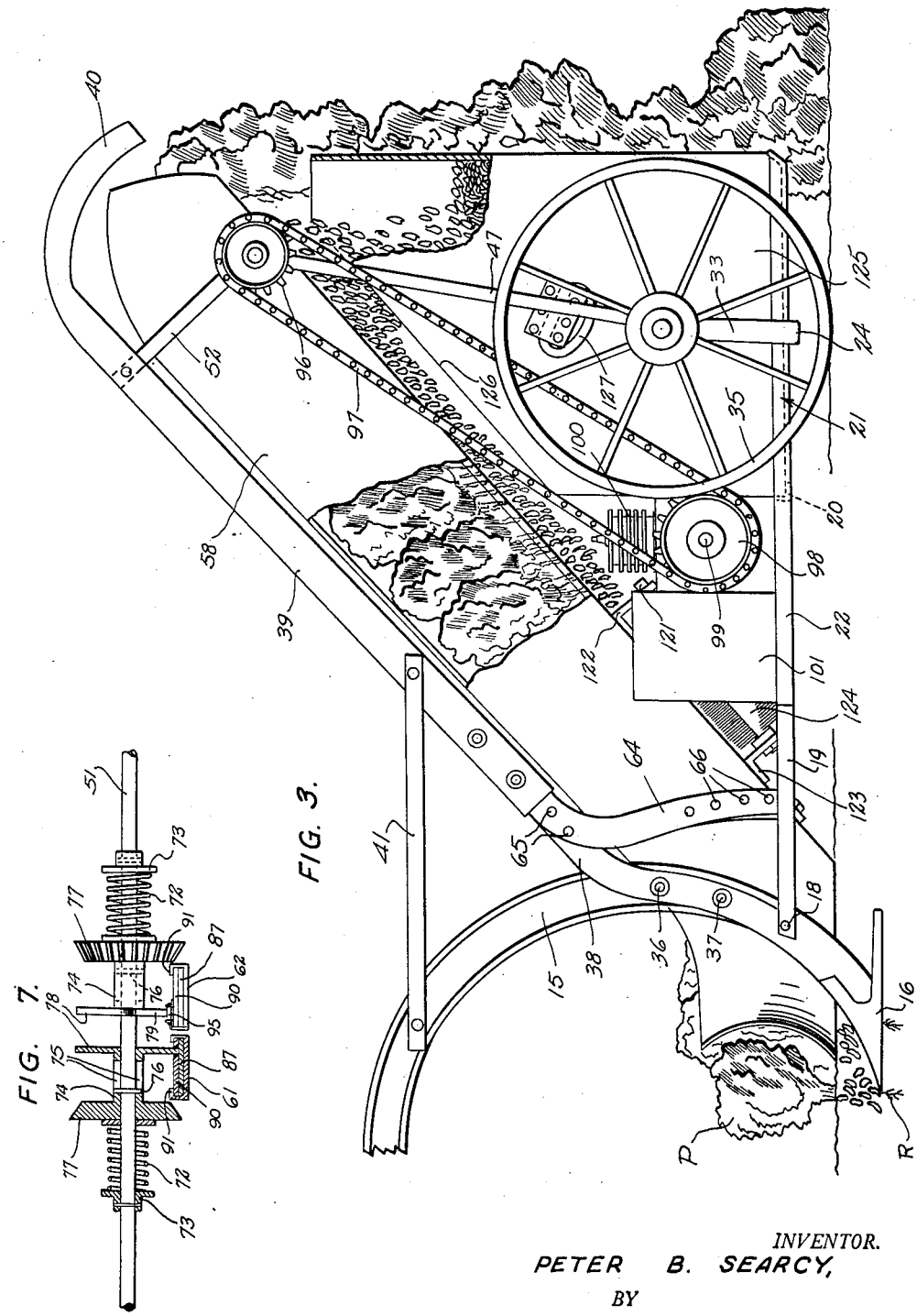

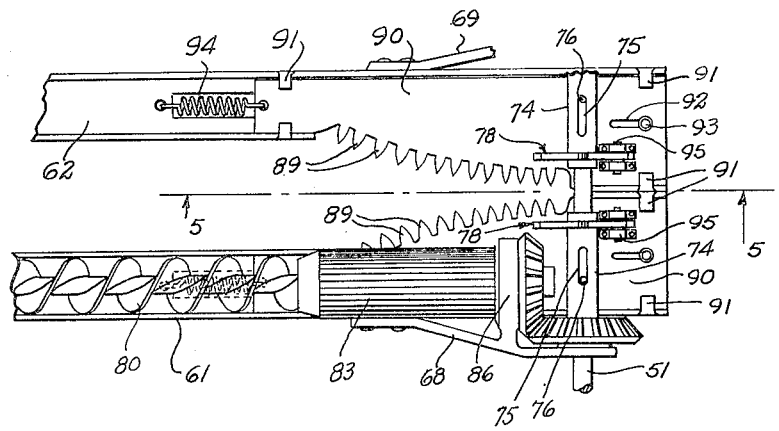
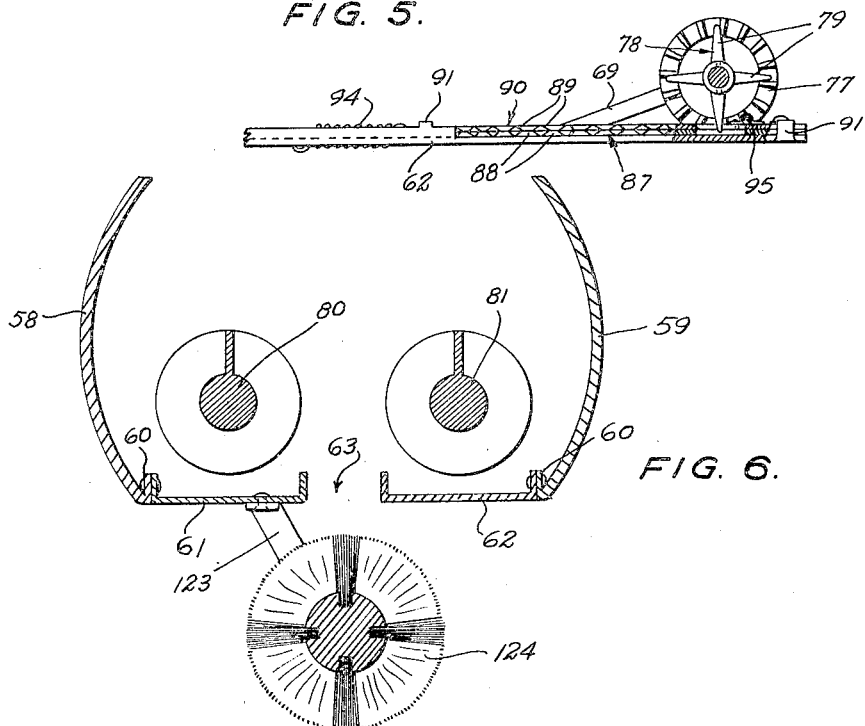

Patented Sept. 19, 1950

2,522,644

UNITED STATES PATENT OFFICE 2,522,644

PEANUT HARVESTING MACHINE

Peter B. Searcy, Austin, Tex.

Application November 10, 1947, Serial No. 785,033

4 Claims. (Cl. 130—30)

My invention relates to a machine for harvesting peanuts.

An important object of the invention is to provide a machine for harvesting the Spanish or bush growing variety of peanuts, where the nuts develop beneath the surface of the soil, and the bush or plant grows above the ground.

A further object of the invention is to provide a peanut harvesting machine, having means to clean the nuts before they are stripped from their tendrils and collected in a receptacle.

A further object is to provide a peanut harvester for bush growing peanuts, wherein a yielding pressure is exerted upon the plants or foliage as they pass through the machine.

A still further object of the invention is to provide a machine of the above mentioned class, which is simple and practical, durable, and relatively inexpensive to build.

Other objects and advantages of the invention will be apparent during the course of the following description.

In the accompanying drawings, forming a part of this application, and in which like numerals are employed to designate like parts throughout the same, Figure 1 is a side elevation of the peanut harvesting machine embodying the invention, part broken away.

Figure 2 is a plan view of the same, part broken away.

Figure 3 is a side elevation showing the opposite side of the machine.

Figure 4 is an enlarged fragmentary view taken on line 4—4 of Figure 1, parts omitted.

Figure 5 is a vertical section taken on line 5—5 of Figure 4.

Figure 6 is a transverse cross-sectional view taken on line 6—6 of Figure 1, parts omitted.

Figure 7 is an enlarged vertical section taken on line 7—7 of Figure 2, parts omitted.

Figure 8 is a plan view, partly diagrammatic, of a support frame.

Figure 9 is an enlarged fragmentary vertical section taken on line 9—9 of Figure 1.

Figure 10 is a fragmentary rear end elevation taken on line 10—10 of Figure 1.

In the drawings, where for the purpose of illustration, is shown a preferred embodiment of the invention, the numeral 15 designates a vertically curved plow beam, carrying a horizontal triangular shaped plow share 16 at its lower end. The front edge 17 of the plow share is disposed diagonally, Figure 2. The upper end of the beam 15 is shown broken away, but extends forwardly of the peanut harvester for attachment to suitable draught mechanism, not shown.

Rigidly attached to one side of the plow beam 15, at a point 18, slightly above the share 16 is the forward end of a horizontal longitudinal frame member or bar 19, preferably formed of angle iron. This bar 19 extends rearwardly, and is rigidly connected at its rear end to a horizontal transverse angle member or bar 20, disposed at right angles thereto, and projecting laterally outwardly therefrom. The outer end of bar 20 is rigidly connected to a horizontal longitudinal angle member or bar 21, parallel to the bar 19, and having a forward extension 22, projecting forwardly of the bar 20 for a substantial distance. The bar 21 also projects rearwardly of the transverse bar 20, and is rigidly connected near its rear end, as at 23, to one end of the downwardly offset transverse horizontal portion 24 of a generally U-shaped support or axle 25. The bar 23 projects rearwardly of the axle 25 for a substantial distance. Rigidly mounted upon the opposite end of the axle portion 24, as at 26, and extending forwardly and rearwardly therefrom is a horizontal longitudinal angle member or bar 27, parallel to the bar 21. The rear end of bar 27 is disposed laterally opposite to the rear end of bar 21. The forward end of bar 27 is rigidly connected to the outer end of a horizontal transverse angle member or bar 27, arranged at right angles thereto, and laterally opposite from and in alignment with bar 20. The inner opposed ends of bars 20 and 28 are spaced apart laterally, as shown in Figure 8. Rigidly attached to the inner end of bar 28, and extending forwardly therefrom and parallel to bar 19 is a horizontal longitudinal member or resilient bar 29. This bar 29 is preferably formed of spring steel, and the relatively wide side of the bar 29 is disposed vertically, so that the bar cannot flex vertically. The bar 29 is however slightly resilient and can be flexed laterally. The forward end of the resilient bar 29 is attached, as at 30, to a curved resilient strap 31, preferably made of spring steel. The resilient strap 31 projects upwardly and forwardly of the forward end of bar 29, and it also extends laterally toward the plow beam 15, and is connected therewith, near the top of the same, as shown at 32.

The U-shaped axle 25 has vertical upstanding arms 33 at its opposite ends, and the arms 33 are disposed outwardly of the bars 21 and 27. The vertical arms 33 carry axially aligned outwardly projecting axle extensions 34, upon which are rotatably mounted wheels 35. The description thus far discloses a horizontal unitary lower support frame, arranged near the ground level, and supported at its forward end by the plow beam 15, and at its rear end by the U-shaped axle 25.

Rigidly secured to the side of plow beam 15, above the point 18, as at 36 and 37 is a rigid hand-bar mounting bracket 38 which projects rearwardly and upwardly from the beam 15. The bracket 38 is rigidly secured to the lower end of a hand-bar 39, which is inclined and projects rearwardly and upwardly. The hand-bar 39 includes a downwardly curved end extension or handle 40. A horizontal longitudinal brace 41 serves to connect the top of beam 15 to the lower portion of hand-bar 39. Disposed laterally opposite to the hand-bar 39, and parallel thereto is a second hand-bar 42, having a handle 43. The hand-bar 42 is rigidly connected at its lower end to a bracket 44, in turn connected at its lower end to the outer side of resilient strap 31, a substantial distance above the point 30. A horizontal longitudinal brace 45, opposite from the brace 41, serves to connect the lower portion of hand-bar 42 to the top of strap 31, as at 46.

Mounted upon the axle extension 34 and disposed outwardly of the bar 21 is an upstanding support arm 47. This support arm 47 carries a bearing 48 at its top end. A similar upstanding support arm 49 is mounted upon the other axle extension 34, and carries an upper bearing 50, the bearing 50 being in axial alignment with the bearing 48. Journaled in the bearings 48 and 50 is a transverse horizontal shaft 51. This shaft is disposed near the top of the harvester, and extends transversely for substantially the full width of the same. Inwardly of the hand-bar 39 a brace 52 connects the shaft 51 and the inner side of hand-bar 39, as at 53. The lower end of brace 52 carries a bearing 54, to rotatably receive the shaft 51. The brace 52 is disposed at right angles to hand-bar 39, Figure 3. A brace 55 is connected to the hand-bar 42, opposite from the brace 52. This brace 55 has a head or bearing 56 for rotatably receiving the shaft 51 therein. The brace 55 is generally horizontal, and is connected to the outer side of hand-bar 42, as at 57. The brace 55 is slightly resilient, and may be flexed laterally a small amount. It is thus seen that the shaft 51 is supported by arms 47 and 49, and connected with hand-bars 39 and 42 through braces 52 and 55. The hand-bars 39 and 42 converge slightly toward their forward ends, Figure 2. As shown clearly in Figure 2, the plow beam 15 is offset slightly from the longitudinal center line of the harvester and toward the bar 19.

Disposed upon opposite sides of the longitudinal centerline of the machine, and arranged in opposed parallel relation are longitudinal inclined conveyor sides or fenders 58 and 59. The fenders 58 and 59 are inclined parallel to the hand-bars 39 and 42, and are transversely and vertically curved, Figure 6, with their concave sides disposed innermost. The lower longitudinal edges of the fenders 58 and 59 are bent to form inner vertical longitudinal flanges 60, to which are rigidly parallel longitudinal channel members or base plates 61 and 62. The inner longitudinal edges of the base plates 61 and 62 are slightly spaced, forming a vertical longitudinal passage 63 at the longitudinal centerline of the machine, and extending for the entire length thereof. The lower forward ends of the fenders 58 and 59 and base plates 61 and 62 are disposed horizontally and at ground level, and are flared laterally outwardly, as shown clearly in Figure 2. The forward flared ends of fenders 58 and 59 are directly over the plow share 16. The upper or discharge ends of the fender 58 projects above and rearwardly of shaft 51. The upper end of fender 59 terminates a short distance above the longitudinal center of the base plate 62, Figure 1. The fender 58 and base plate 61 carried thereby are resiliently supported near their lower ends by a resilient spring steel bracket or band 64, attached at its top end to bracket 38, as at 65, and curved about the outer side of fender 58 and secured thereto, as at 66. The fender 59 and base plate 62 carried thereby are correspondingly resiliently supported near their forward ends by resilient strap 31, secured to fender 59, as at 67. At their upper ends fenders 58 and 59 and base plates 61 and 62 are supported by arms 68 and 69, having upper forked ends 70 to slidably engage around the shaft 51. The lower forward ends of arms 68 and 69 are rigidly attached to the side edges of base plate 61 and 62, as at 71. The arms 68 and 69 are preferably formed of spring steel, and are somewhat resilient and may be flexed laterally. It is thus seen that the fenders 58 and 59, and base plates 61 and 62 carried thereby are resiliently mounted at their upper and lower ends, and they may be flexed laterally for a small distance. Extensible coil springs 72 are loosely mounted upon the shaft 51. The outer ends of these springs 72 engage annular collars 73, rigidly connected to the shaft. Their inner ends engage against the outer sides of arm 68 and 69, and serve to resiliently urge the same inwardly laterally.

Also mounted upon shaft 51, inwardly of arms 68 and 69 are cylindrical sleeves 74, having diametrically oppositely arranged longitudinal slots 75 formed therein. Pins 76, rigidly mounted upon shaft 51 have their opposite ends projecting into slots 75, Figure 7, for causing the sleeves 74 to rotate with shaft 51. The sleeves 74 are slidably axially upon the shaft 51. Formed integral with sleeves 74, and disposed at opposite ends of the same, are bevel gears 77, and indexing toothed wheels or cams 78, having radial fingers 79. The outer surfaces of bevel gears 77 are adjacent to arms 68 and 69. The cams 78 are disposed near the inner longitudinal edges of base plates 61 and 62, Figure 7. The sleeves 74, gears 77, and cams 78 rotate with shaft 51.

Arranged above the base plates 61 and 62, and spaced upwardly, slightly, therefrom, and extending for substantially the full length of the same, are rotatable spiral shafts or conveyors 80 and 81. These shafts or conveyors 80 and 81 are journaled at their lower ends in stationary bearings 82, rigidly mounted upon base plates 61 and 62, near the lower ends of the same. Near their top ends, the shafts 80 and 81 carry corrugated rollers 83, which are rigidly mounted upon the shafts, for rotation therewith. The top ends of the spiral shafts 80 and 81 have bevel gears 84 and 85 rigidly mounted thereon, and arranged in meshed engagement with gears 77. The spiral shafts 80 and 81 are journaled near their upper ends in bearing extensions 86, integral with arms 68 and 69. The bearing extensions 86 project laterally inwardly of the arms 68 and 69, and they engage the shafts 80 and 81 adjacent to the lower sides of gears 84 and 85, as shown.

Arranged beneath the corrugated rollers 83, and beneath the shaft 51, and rigidly mounted upon the top surfaces of base plates 61 and 62, are relatively stationary flat cutting plates 87, having longitudinally curved inner opposed edges provided with cutting teeth 88. The curved edges having the teeth 88 project laterally inwardly of the base plates 61 and 62 and converge rearwardly beneath shaft 51, Figure 4. Slidably mounted upon the stationary cutting plates 87, and being of the same shape, and provided with cutting teeth 89, are reciprocating cutting plates 90. These plates 90 are adapted to slide longitudinally upon the lower cutting plates 87, and they are guided by longitudinally spaced side tabs 91, formed upon the base plates 61 and 62. The top cutting plates 90 have longitudinal slots 92 to slidably receive upstanding pins 93, rigidly secured to the lower cutting plates 87. The slots 92 and pins 93 further guide the top reciprocating cutting plates 90, and maintain the same in alignment. The cutting plates 90 are urged forwardly by retractile coil springs 94, attached to the forward ends of cutting plates 90, and to the adjacent base plates 61 and 62. Thus the plates 87 and the plates 89 form opposed converging pairs of horizontally disposed toothed plates spaced from each other to form a passage therebetween. Mounted upon the top cutting plates 90, adjacent to the cams 78, are trip elements in the form of short horizontal rollers 95, and these rollers are engaged by the cam fingers 79, to move the cutting plates 90 longitudinally. Each time one of the cam fingers 79 causes the top cutting plate beneath it to move rearwardly, longitudinally, the connected spring 94 pulls it back to its initial forward location, thus imparting a reciprocating motion to the top cutting plate. The slots 92 limit the longitudinal movement of the top cutting plates 90.

Mounted upon the horizontal shaft 51, outwardly of the arm 47 is a sprocket wheel 96, driven by a chain 97 which extends downwardly and forwardly, and is in turn driven by a sprocket wheel 98, rigidly mounted upon the crank shaft extension 99 of an engine 100. The engine 100 is suitably rigidly mounted upon the longitudinal bars 19 and 22, as is a gas tank 101. The engine crank shaft has a laterally inwardly projecting extension 102, having axial or longitudinal splines 103. A bevel gear 104 is mounted upon the shaft extension 102, for rotation therewith, and this gear may slide axially upon the shaft extension. The gear 104 is in meshed engagement with a bevel gear 105, mounted upon a short shaft 106, for rotation therewith. The shaft 106 is inclined, and a bevel gear 107 is mounted upon its upper end. The gear 107 is in meshed engagement with a small bevel gear 108, rigidly mounted upon a rotatable shaft 109. The shaft 109 is journaled in a bearing 110, rigidly secured to the under side of base plate 61, by bracket 111, rigidly secured to bearing. The bearing 110 has a radial arm 112 having an extension 113, serving as a bearing for the short shaft 106, and supporting the same. The arm 112 has a depending longitudinal extension 114, having a bottom U-shaped end 115 to surround the lower side of gear 104, Figure 9. The end 115 has an inner projection 116, to engage the outer side of gear 104 and maintain the same in meshed engagement with gear 105. The end of shaft extension 102 is journaled in a bearing recess 117 in extension 114. Mounted upon the shaft 109, adjacent to bearing 110, is a sprocket wheel 118, driven by a chain 119, in turn driven by a sprocket wheel 120. The sprocket wheel 120 is rigidly mounted upon a rotatable shaft 121, journaled in end bearing brackets 122, and 123 rigidly secured to the under side of base plate 61, and depending therefrom. Mounted upon the shaft 121, for rotation therewith, is a rotary brush 124, having relatively soft resilient bristles. The brush 124 is disposed slightly below the base plates 61 and 62, and adjacent to the longitudinal passage 63.

Removably mounted upon the horizontal frame members or bars 21, 27, 20, and 28, is receptacle or can 125, open at its top, and having inclined top edges 126, parallel to fenders 58 and 59. The can 125 is disposed beneath the corrugated rollers 83. The can 125 is provided with handles 127, as shown.

The operation of the machine is as follows:

The engine 100 of the machine is started, and this engine drives the shaft 51 and rotary brush 124. The shaft extension 99 drives sprocket wheel 98, driving chain 97, sprocket wheel 96, and shaft 51. The sleeves 74 are driven by pins 76, driving gears 77 and cams 78. Gears 77 drive gears 84 and 85, driving spiral shafts 80 and 81 and corrugated rollers 83 in the direction of the arrows in Figure 2. Simultaneously the shaft extension 102 rotates, driving gear 104, gears 105, 107, and 108, sprocket wheel 118, chain 119, sprocket wheel 120 and brush 124.

While engine 100 is running the machine is drawn forwardly. The plow share 116 is below the surface of the soil and severs the tap roots R of peanut plants P, as the harvester advances. The peanuts N are attached to individual tendrils, and grow just beneath the surface of the soil, Figures 1 and 3. As the machine advances, and the tap roots R are severed, the upper foliage of the plants P enters the forward flared ends of fenders 58 and 59. The plants then engage the lower ends of spiral shafts or conveyors 80 and 81, and these shafts cause the entire plants and peanuts to travel upwardly between fenders 58 and 59. The peanuts N are suspended from the tendrils to which they are attached, and are disposed in the longitudinal passage 63, during their ascent. As the plants travel upwardly, the peanuts are dragged over the rotary brush 124, which cleans them of excess dirt or soil. As the plants approach the top of the machine, the suspended peanuts enter between the cutting plates 87 and 90. The top plates 90 are reciprocating, because of the coaction of fingers 79 and pins 95 previously described. When the tendrils holding the peanuts N reach the top converged edges of cutting plates 87 and 90, the cutting teeth 88 and 89 coact to sever the nuts from the tendrils, and the severed nuts fall into the can 125. Simultaneously with the cutting action just described, the corrugated rollers 83 engage the lower portions of the plant and pull the plant upwardly, tending to pull the suspended peanuts up between the cutting plates. This upward pulling action, caused by rollers 83, aids in severing the peanuts from their tendrils, and also facilitate the discharge of the stripped peanut plants from the rear end of the harvester. The rollers 83 expel the plants upwardly against the upper curved end of fender 58, and the plants are discharged at the rear end to one side of the harvester.

During the above described continuous operation, the opposed fenders 58 and 59 may flex outwardly laterally to widen the passage 63, if an excessively large peanut plant enters between the same. This is possible because of the resilient mounting of the fenders, previously described. When a large plant causes the fenders 58 and 59 to move laterally outwardly, the spiral shafts 80 and 81 must move also. Therefore, the gears 77 carried by sleeves 74 must move outwardly on the shaft 51, while continuing to drive the gears 84 and 85. The slots 75 permit of this action. The springs 72 hold the gears 77 and 84 and 85 in mesh. Likewise, when the fenders separate laterally, the gears 104 and 105 are held in mesh by the end 115, and the gear 104 can slide axially on the splined end of shaft 102, as stated.

It is to be understood that the form of the invention herewith shown and described is to be taken as a preferred example of the same, and that various changes in the shape, size and arrangement of parts may be resorted to, without departing from the spirit of the invention, or the scope of the subjoined claims.

Having thus described the invention, I claim:

1. In a peanut harvester, a wheeled frame, a horizontally disposed shaft arranged transversely of said frame and rotatably supported in said frame, a pair of horizontally disposed rotatable rollers positioned adjacent said shaft and spaced from said shaft, said rollers being spaced from each other to form a passage therebetween for embracingly engaging peanut vines when traveling therethrough, opposed converging pairs of horizontally disposed toothed plates positioned below and in parallel spaced relation with respect to said rollers and spaced from each other to form a passage therebetween for severing the peanuts from the peanut vines when the latter are traveling through the passage between said rollers, each of said pairs of plates embodying a fixed plate and a movable plate superimposed upon said fixed plate and operatively connected to said shaft for longitudinal movement toward and away from said shaft, means operatively connecting said rollers to said shaft, and means connected to said shaft for effecting the rotation thereof.

2. In a peanut harvester, a wheeled frame, a horizontally disposed shaft arranged transversely of said frame and rotatably supported in said frame, a pair of horizontally disposed rotatable rollers positioned adjacent said shaft and spaced from said shaft, said rollers being spaced from each other to form a passage therebetween for embracingly engaging peanut vines when traveling therethrough, opposed converging pairs of horizontally disposed toothed plates positioned below and in parallel spaced relation with respect to said rollers and spaced from each other to form a passage therebetween for severing the peanuts from the peanut vines when the latter are traveling through the passage between said rollers, each of said pairs of plates embodying a fixed plate and a movable plate superimposed upon said fixed plate and operatively connected to said shaft for longitudinal movement toward and away from said shaft, spring means operatively connected to said movable plate for urging the latter away from said shaft, means operatively connecting said rollers to said shaft, and means connected to said shaft for effecting the rotation thereof.

3. In a peanut harvester, a wheeled frame, a horizontally disposed shaft arranged transversely of said frame and rotatably supported in said frame, a pair of horizontally disposed rotatable rollers positioned adjacent said shaft and spaced from said shaft, said rollers being spaced from each other to form a passage therebetween for embracingly engaging peanut vines when traveling therethrough, opposed converging pairs of horizontally disposed toothed plates positioned below and in parallel spaced relation with respect to said rollers and spaced from each other to form a passage therebetween for severing the peanuts from the peanut vines when the latter are traveling through the passage between said rollers, each of said pairs of plates embodying a fixed plate and a movable plate superimposed upon said fixed plate and operatively connected to said shaft for longitudinal movement toward and away from said shaft, a trip element projecting from the upper face of each of said movable plates, a pair of spaced sleeves circumposed on said shaft, a toothed wheel carried by each of said sleeves and engageable with the trip element adjacent thereto, means operatively connecting said rollers to said shaft, and means connected to said shaft for effecting the rotation thereof.

4. In a peanut harvester, a wheeled frame, a horizontally disposed shaft arranged transversely of said frame and rotatably supported in said frame, a pair of horizontally disposed rotatable rollers positioned adjacent said shaft and spaced from said shaft, said rollers being spaced from each other to form a passage therebetween for embracingly engaging peanut vines when traveling therethrough, opposed converging pairs of horizontally disposed toothed plates positioned below and in parallel spaced relation with respect to said rollers and spaced from each other to form a passage therebetween for severing the peanuts from the peanut vines when the latter are traveling through the passage between said rollers, each of said pairs of plates embodying a fixed plate and a movable plate superimposed upon said fixed plate and operatively connected to said shaft for longitudinal movement toward and away from said shaft, a trip element projecting from the upper face of each of said movable plates, a pair of spaced sleeves circumposed on said shaft, a toothed wheel carried by each of said sleeves and engageable with the trip element adjacent thereto, spring means operatively connected to said movable plate for urging the latter away from said shaft.

PETER B. SEARCY.

REFERENCES CITED

The following references are of record in the file of this patent:

UNITED STATES PATENTS

| Number | Name | Date |
|---|---|---|
| 634,873 | Brown | Oct. 17, 1899 |
| 660,944 | Bowen | Oct. 30, 1900 |
| 798,305 | Smith | Aug. 29, 1905 |
| 814,747 | Sullivan | Mar. 13, 1906 |
| 958,165 | Parsons | May 17, 1910 |
| 1,177,995 | Crozier | Apr. 4, 1916 |
| 1,204,627 | Williams | Nov. 14, 1916 |
| 1,251,425 | Rogers et al. | Dec. 25, 1917 |
| 1,280,207 | Glaze | Oct. 1, 1918 |
| 1,301,006 | Prior | Apr. 15, 1919 |
| 1,768,396 | Conrad | June 24, 1930 |
| 2,380,193 | Scott | July 10, 1945 |